United States Patent [19]
Zakelj

[11] Patent Number: 6,112,167
[45] Date of Patent: Aug. 29, 2000

[54] TIRE TREAD NOISE TREATMENT

[75] Inventor: Paul Zakelj, Stow, Ohio

[73] Assignee: Bridgestone/Firestone Inc., Akron, Ohio

[21] Appl. No.: 09/004,371

[22] Filed: Jan. 8, 1998

[51] Int. Cl.$^7$ ............................ B60C 11/11; B60C 11/03; B60C 11/00
[52] U.S. Cl. ............... 702/191; 152/209 N; 152/209 NS
[58] Field of Search ............................ 702/191; 364/149, 364/468.04; 152/209 N, 209 NS

[56] References Cited

U.S. PATENT DOCUMENTS

| | | |
|---|---|---|
| 4,178,199 | 12/1979 | Lippman et al. . |
| 4,327,792 | 5/1982 | Landers . |
| 4,442,499 | 4/1984 | Sekula et al. . |
| 4,474,223 | 10/1984 | Landers . |
| 4,721,141 | 1/1988 | Collette et al. . |
| 4,727,501 | 2/1988 | Parker et al. . |
| 4,788,651 | 11/1988 | Parker et al. . |
| 5,240,054 | 8/1993 | Kogure . |
| 5,295,087 | 3/1994 | Yoshida et al. . |
| 5,309,965 | 5/1994 | Williams ............................ 152/209 R |
| 5,314,551 | 5/1994 | Williams . |
| 5,371,685 | 12/1994 | Bandel et al. . |
| 5,383,506 | 1/1995 | Kogure ............................ 152/209 R |
| 5,394,916 | 5/1995 | Williams ............................ 152/209 R |
| 5,617,341 | 4/1997 | Nakajima ............................ 364/578 |
| 5,717,613 | 2/1998 | Nakajima ............................ 364/578 |
| 5,746,848 | 5/1998 | Schulze et al. ..................... 152/209 R |
| 5,759,310 | 6/1998 | Wesolowski ....................... 152/209 R |
| 5,759,311 | 6/1998 | Williams ............................ 152/209 A |
| 5,759,312 | 6/1998 | Wesolowski ....................... 152/209 R |
| 5,769,990 | 6/1998 | Hoffmeister ......................... 156/110.1 |
| 5,865,921 | 2/1999 | Zakelj et al. ......................... 156/110.1 |

OTHER PUBLICATIONS

John J. Benedetto and Michael W. Frazier; *Wavelets: Mathematics and Applications;* date unknown; pp. 2–13.

Brian G. Ferguson and Barry G. Quinn; *Application of the short–time Fourier transform and the Wigner–Ville distribution to the acoustic localization of aircraft;* Aug. 1994; pp. 821–827.

R.C. Mellin and G. Sovran; *Controlling the Tonal Characteristics of the Aerodynamic Noise Generated by Fan Rotors;* Mar. 1970, pp. 143–154.

Thomas A. Williams; *Tire Tread Pattern Noise Reduction Through the Application of Pitch Sequencing;* date unknown; pp. 955–959.

*Primary Examiner*—Patrick Assouad
*Attorney, Agent, or Firm*—D. A. Thomas; John Hornickel

[57] ABSTRACT

A technique for estimating the harmonic content of a tread pattern design and specifically a tire pitch sequence. Pitch sequence harmonic content is obtained and analyzed as a function of position along the sequence, i.e., along the circumference of the tire tread. This localized harmonic content information may be used to assess the noise performance of a particular tire tread and further may be used as a criteria for selecting an optimal tire tread pitch sequence along with other performance criteria such as traction, tread wear, etc.

20 Claims, 3 Drawing Sheets

TIRE TREAD NOISE TREATMENT

The invention herein described relates generally to the art of tires and, more particularly, to arrangements for analyzing and/or suppressing tire noise for the purpose of producing tires that generate less noise when rolling over a road surface.

BACKGROUND OF THE INVENTION

The tread of conventional vehicle tires typically comprises a plurality of load bearing tread block elements separated by a network of grooves. The tread block elements are arranged in a pattern around the circumference of the tire. As the tire rolls over a road surface, the tread block elements move into and out of engagement with the road surface causing disturbances in the surrounding air molecules that generate sounds. For any given tread pattern a certain amount of acoustic energy is produced. The distribution of the acoustic energy over the audio frequency spectrum has been found to be controlled at least in part by the geometry of the tread block elements and grooves. Where tread block elements of constant pitch length have been used to completely surround a tire, the sound generated is dominated by a single frequency and its harmonics, i.e., a majority of the sound generated is concentrated into a small frequency range of the audio frequency spectrum. This tonal concentration may be highly disturbing to the occupants of the vehicle on which the tire is mounted.

Much effort has been directed to the reduction of objectionable tire noise, with emphasis on the spreading of the energy produced by the tire tread over the audio frequency spectrum thereby to reduce objectionable tonal concentration. A technique known as "pitching" accomplishes this by varying the length, i.e., the pitch, of the design cycle of the tread of the tire around its circumference, with the result being a variable pitch tire tread pattern. The design cycle is a representative portion of the tread which typically comprises in the circumferential direction at least one tread block element and a generally transversely extending groove. For conditions of practical manufacture of the molds for the tires, the circumference of the tire is composed of an integer number of design cycles. The lengths of the design cycles may be varied in a random or preselected algorithmic manner to distribute the audio noise throughout the frequency spectrum.

In order to avoid the high cost of building and testing tires with different tread patterns, computer simulations have been used to perform tread pattern analysis. A common technique in the tire industry regarding pitch sequence analysis is to view the Fourier spectrum of the entire pitch sequence. See, for example, SAE paper 951352 entitled "Tire Tread Pattern Noise Reduction Through the Application of Pitch Sequencing." Such technique provides meaningful information about the acoustical output of a tire pitch sequence which aids in the task of reducing objectionable tire noise. This enables various pitch sequences to be analyzed in order to identify an optimal pitch sequence that can then be applied to a test tire for actual physical testing.

SUMMARY OF THE INVENTION

The present invention provides a more refined technique for estimating the harmonic content of a tread pattern design and specifically a tire pitch sequence. Instead of analyzing the Fourier spectrum of the entire pitch sequence of a tire, pitch sequence harmonic content is obtained and analyzed as a function of position along the sequence, i.e., along the circumference of the tire tread. This localized harmonic content information may be used to assess the noise performance of a particular tire tread and further may be used as a criteria for selecting an optimal tire tread pitch sequence along with other performance criteria such as traction, tread wear, etc.

According to a preferred embodiment of the invention, the Fourier spectrum is obtained for a number of small portions of the tire pitch sequence until the entire tire pitch sequence is analyzed. This yields advantages over the prior art technique which obtained only one average Fourier spectrum for the entire sequence. For instance, the invention enables the analysis of the harmonic content of specific portions of the tire pitch sequence which provides insight into the fluctuations of different harmonic components as a function of sequence position.

Thus, according to one aspect of the invention, a method of estimating the harmonic content of specific portions of a tread pitch sequence, comprises the steps of: (a) providing a waveform corresponding to the pitch sequence, (b) using a transform function to provide a representation of the harmonic content as a function of circumferential position, and (c) assessing the harmonic content of the tread pitch sequence. In a preferred embodiment, the assessing step includes identifying high amplitude sections, and the identifying step may include a determination of the number of amplitude sections that exceed a predetermined criteria and then grading the overall harmonic content of the tread pitch sequence as a function of such number.

According to another aspect of the invention, a method of designing a tire tread is improved by providing a waveform corresponding to the pitch sequence; and processing the waveform to obtain a circumferential-harmonic distribution of sound amplitude.

The invention also provides tires having tread patterns derived from the application of the methodology herein described.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION OF THE INVENTION

Figure 1:
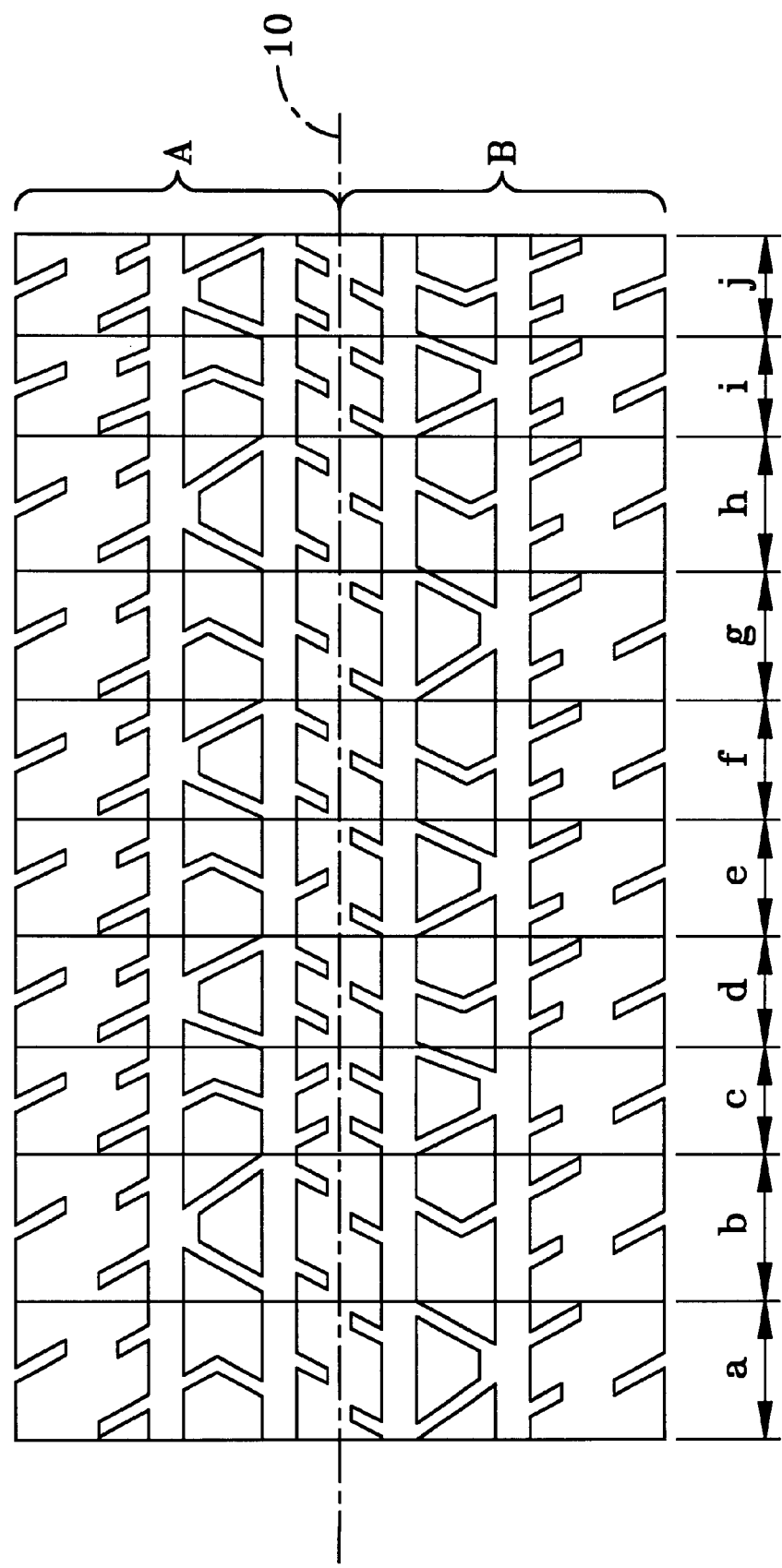
FIG. 1 is a plan view of a tire tread footprint.

Referring now in detail to the drawings, wherein the showings are for the purpose of illustrating examples and a preferred embodiment of the invention only and not for purposes of limiting same, FIG. 1 shows an exemplary tire tread plan view having circumferentially continuous tire tread sections A and B on opposite sides of the tire's circumferential centerline 10. The tire tread sections A and B are formed in a mold having mold halves that fit together along a mold parting line corresponding to the circumferential centerline 10. The mold halves are rotatable relative to one another along the mold parting line so that the tire sections A and B can be circumferentially shifted relative to one another. Such rotation makes it possible to locate undesirable sound events out of phase with one another so that such undesirable sound events are not magnified. These and other advantages of mold rotation for suppressing tire noise are well known in the art.

The tire tread of FIG. 1 has tread elements, corresponding to a design cycle, arranged in a pitch sequence generally indicated by pitches a-j. The have at least two different lengths and most preferably have more than two different lengths. The frequency at which tire tread elements impact a pavement as a tire rolls at a given speed is determined by the pitch lengths and the tread pitch sequence.

The tread elements preferably are arranged around the circumference of the tire in a sequence that is designed for suppressing noise. As above indicated, the tread elements may have different pitch lengths. Although it would it would be advantageous for each tread element to have a pitch length, i.e., circumferential length, different from every other pitch length, manufacturing and cost considerations usually dictate using a limited number of different lengths, typically 3 to 7 different lengths, which are then arranged in a scrambled pitch sequence for suppressing tire noise. By way of example, a tire may use seven different pitch lengths numbered 1 through 7 and the pitch sequence for section A of the tire may be: 21111262115133363244766236 642676552122347734211233454257315151451267464, while the pitch sequence for section B may be the same sequence in reverse order.

In accordance with the present invention, the harmonic content of specific portions of the pitch sequence is estimated by utilizing a simulated representation of the pitch sequence, herein referred to as a noise sequence. The localized harmonic content may be obtained using known spectral analysis techniques including Short-Time Fourier Transform (STFT) and Wigner-Vile Distribution and Wavelet Transforms. In particular, the harmonic content of specific portions of a noise sequence can be estimated using the STFT:

$$\text{STFT}(T,f) = \int x(t) g(t-T) \exp(-2j\pi ft) dt$$

Figure 2:
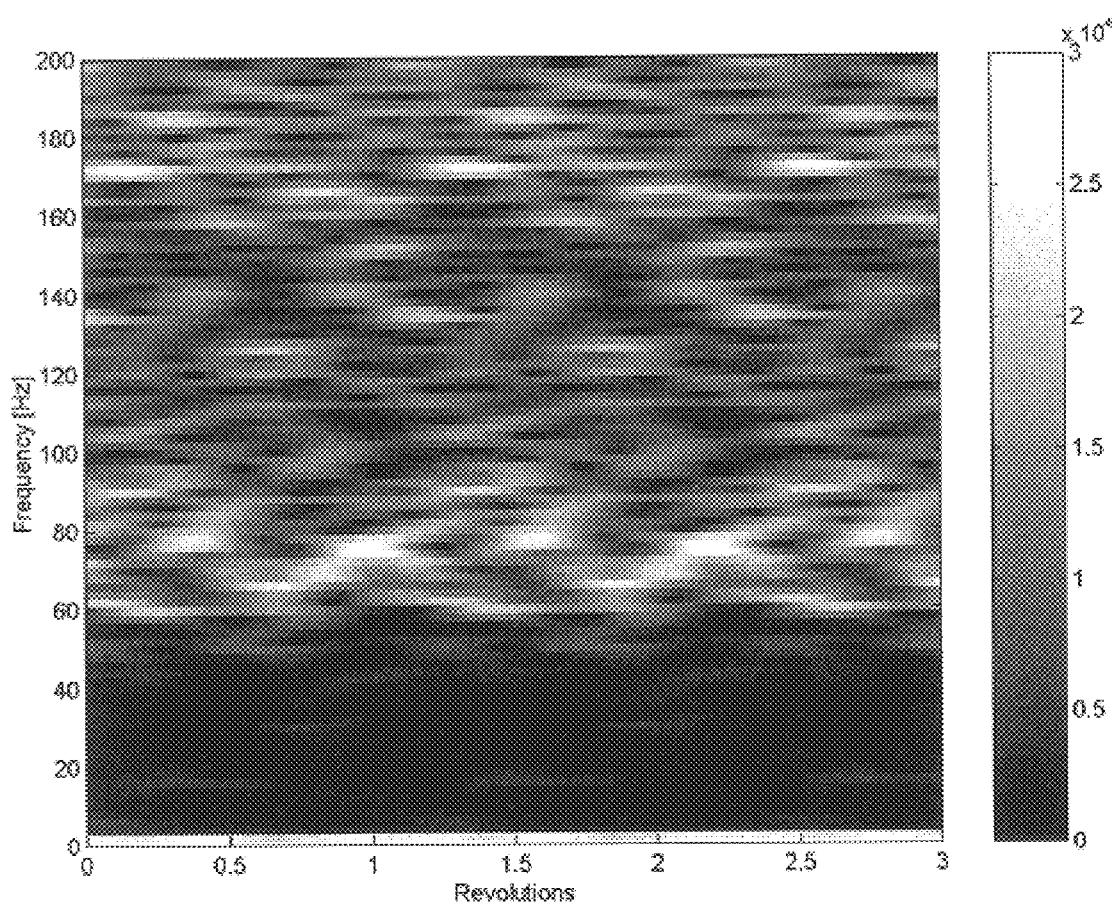
FIG. 2 shows in black and white a spectrogram of a tire pitch sequence.

The Fourier spectrum is obtained for a number of small portions of the sequence signal windowed by g(t−T) until the entire sequence is analyzed. This analysis treats the noise sequence signals as nonstationary signals characterized by changing features in the harmonic (or frequency) content with respect to circumferential position (or time). This yields a circumferential-harmonic distribution which may be illustrated in the form of a spectrogram. An exemplary spectrogram is illustrated in FIG. 2, with circumferential position on the x-axis, harmonic number on the y-axis, and amplitude represented by color (in FIG. 2, the spectrogram, which normally is in color, is shown in black and white with different colors being depicted by different shades of gray according to the scale shown at the right in FIG. 2). Waterfall plots may also be used to provide a similar output.

Regardless of the manner in which the circumferential-harmonic distribution is displayed for visual analysis or outputted for computer analysis, localized areas of high noise can be determined and specifically related to corresponding locations on the tire pitch sequence. Localized areas of high noise can lead to objectionable tire noise. The localized noise information can be used to identify specific areas for further noise treatment, to grade competing pitch sequences for noise performance, etc.

Figure 3:
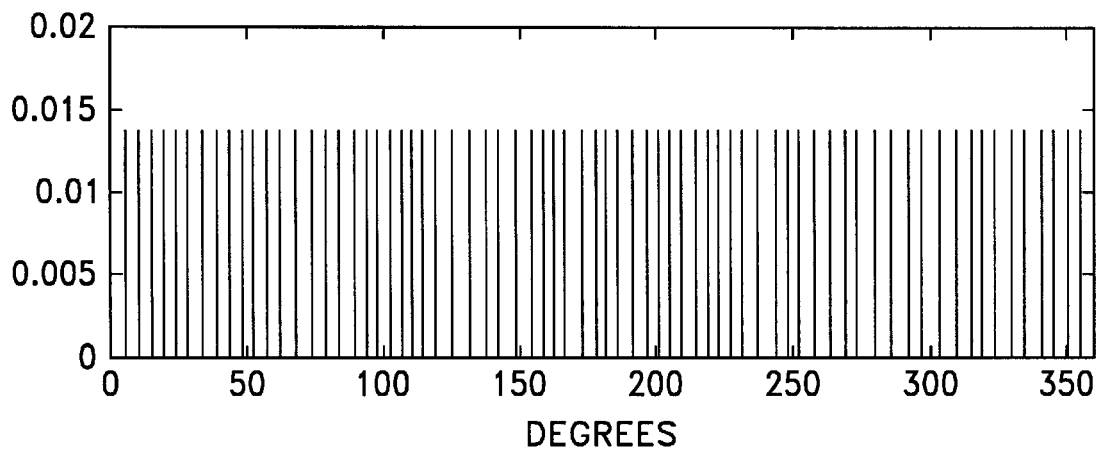
FIG. 3 shows an exemplary simulated pitch sequence, circumferential domain representation comprised of impulses, the spacing of which is proportional to the pitch lengths determined by the sequence.
Figure 4:
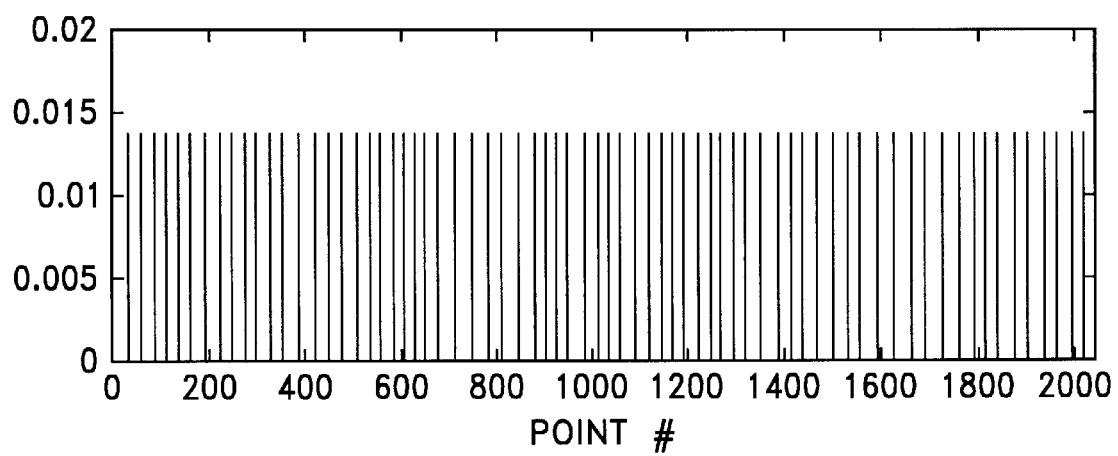
FIG. 4 shows the pitch sequence of FIG. 3 as a spatial (time) domain representation.

A preferred procedure for estimating the harmonic content of specific portions of a pitch sequence selects a sequence signal representative of the pitch sequence. FIG. 3 shows an exemplary simulated pitch sequence, circumferential domain representation comprised of impulses, the spacing of which is proportional to the pitch lengths determined by the sequence. That is, the distance between relatively adjacent lines corresponds to the pitch length of the element at the corresponding location about the circumference of the tire, identified by the number of degrees from an arbitrary reference point. The same pitch sequence is shown in FIG. 4 as a spatial (time) domain representation. It should be understood that the illustrated impulse function signal is a simplistic (although useful) simulation for purposes of explaining the methodology of the present invention and that other representations or waveforms, such as rectangular, sinusoid and sawtooth waveforms, can also be used.

The sequence signal is then operated on utilizing STFT to obtain the harmonics and amplitudes along the circumference of the tire. This may be done using MATLAB software available from the MathWorks, Inc., 24 Prime Park Way, Natick, Mass. Specifically, the MATLAB specgram function is used to provide the circumferential-dependent harmonic content of the sequence signal. The specgram function calculates the spectrogram for the signal to be transformed and has as its inputs:

a the signal to be transformed nfft the FFT length, for example 1024

Fs the sampling frequency, for example 2048 window the windowing function and its length, for example hamming(1024)

nooverlap the number of samples by which the segments overlap, for example 1000

An example of the software routine is as follows:

%specgram of pitch sequence cadseq sequence=[seq1;seq1;seq1];

[B,F,T]=specgram(sequence,1024,2048,hamming(1024),1000);

imagesc(3*(T/max(T)),F(2:200),(200000*abs(B(2:200,:))),[0 3e4]);

xlabel('revolutions');ylabel('harmonics');title(name);axis([0 3 0 200]) colormap('hot');colorbar;

In the above example, the impulse function signal (seq1) is connected to itself twice so that a signal is created which represents three tire revolutions. The three-sequence signal is then operated on utilizing the specgram program.

In FIG. 2, the harmonic segments are disposed along the y-axis with each containing an estimate of the localized amplitude along the circumference of the tire which is plotted on the x-axis. As above indicated, the spectrogram is normally depicted in color with different colors representing different amplitudes. In FIG. 2, the amplitudes are shown using a gray scale shown at the right in FIG. 2. As illustrated, the whiter (less gray) areas represent high amplitudes and thus hot spots in the spectrogram. In the illustrated spectrogram, hot spots appear at the 78–80 harmonics and at the 174–176 harmonics.

The harmonic content of the tread pitch sequence is assessed to identify high amplitude sections. This identifying step may include a determination of the number of amplitude sections that exceed a predetermined criteria and then grading the overall harmonic content of the tread pitch sequence as a function of such number. The localized amplitude information may be compared, either visually or mathematically, to empirical data to develop criteria for evaluating the noise performance of a tire. For instance, large high amplitude areas and/or a multiplicity of high amplitude areas will most likely be indicative of a noisy tire, especially when compared to a spectrogram exhibiting very few or no high amplitude areas. Also, the spectrogram can be used to locate a particular region of the pitch sequence which is noisy, whereupon a modification of the pitch sequence can be made in this region to reduce the noise originating from this region.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A method of estimating the harmonic content of a tread pitch sequence, comprising the steps of:

providing a waveform corresponding to the entire tread pitch sequence;

using a transform function to provide a representation of the harmonic content of different specific portions of the pitch sequence;

assessing the harmonic content of the tread pitch sequence based on the representation of the harmonic content of the different specific portions of the pitch sequence.

2. A method as set forth in claim 1, wherein said assessing step includes identifying high amplitude sections.

3. A method as set forth in claim 2, wherein said identifying step includes determining the number of amplitude sections that exceed a predetermined criteria and then grading the overall harmonic content of the tread pitch sequence as a function of such number.

4. A method as set forth in claim 1, wherein said providing step includes using an impulse function signal.

5. A method of estimating the harmonic content of specific portions of a tread pitch sequence, comprising the steps of:

providing a waveform corresponding to the pitch sequence; and using a transform function to provide a representation of the harmonic content as a function of circumferential position; and assessing the harmonic content of the tread pitch sequence;

wherein said providing step includes connecting the impulse function signal to itself at least one time to create a representation of at least two revolutions.

6. A method as set forth in claim 1, wherein said using step includes providing a spectrogram of the harmonic content of the pitch sequence as a function of circumferential position.

7. A tire made by using the method of claim 1.

8. In a method of designing a tire tread, the improvement comprising:

processing a waveform corresponding to the entire pitch sequence to provide a representation of the harmonic content of a plurality of circumferential portions, and combining the representations of the circumferential portions to obtain a circumferential-harmonic distribution of sound amplitude.

9. A method as set forth in claim 8, wherein said providing step includes using an impulse function signal.

10. In a method of designing a tire tread, the improvement comprising:

providing a waveform corresponding to the pitch sequence, and processing the waveform to obtain a circumferential-harmonic distribution of sound amplitude;

wherein said providing step includes connecting an impulse function signal to itself at least one time to create a representation of at least two revolutions.

11. A method as set forth in claim 8, wherein the harmonic content of the pitch sequence is displayed as spectrogram.

12. A method as set forth in claim 8, including the step of identifying high amplitude sections in the circumferential-harmonic distribution of sound amplitude.

13. A tire made by using the method of claim 8.

14. A method as set forth in claim 6, wherein said assessing step includes identifying high amplitude sections.

15. A method as set forth in claim 14, wherein said identifying step includes determining the number of amplitude sections that exceed a predetermined criteria and then grading the overall harmonic content of the tread pitch sequence as a function of such number.

16. A method as set forth in claim 6, wherein said providing step includes using an impulse function signal.

17. A method of estimating the harmonic content of a tread pitch sequence, comprising the steps of:

providing a waveform corresponding to the entire tread pitch sequence;

using a transform function to provide a representation of the harmonic content of different specific portions of the pitch sequence;

assessing the harmonic content of the tread pitch sequence based on the representation of the harmonic content of the different specific portions of the pitch sequence;

wherein said using step includes providing a spectrogram of the harmonic content of the pitch sequence as a function of circumferential position and;

wherein said providing step includes using an impulse function signal and connecting the impulse function signal to itself at least one time to create a representation of at least two revolutions.

18. A method of estimating the harmonic content of a tread pitch sequence, said method comprising the steps of:

generating a waveform corresponding to the entire tread pitch sequence;

separating the waveform into circumferential portions;

providing a representation of the harmonic content of each of the circumferential portions;

combining the representations of the circumferential portions;

accessing the harmonic content of the tread pitch sequence based on the combined representations.

19. A method as set forth in claim 18, wherein said providing step comprises using a transform function.

20. A method as set forth in claim 18, wherein said providing step comprises generating a spectrogram of the harmonic content of each of the circumferential portions.

* * * * *